United States Patent [19]
Nadachi

[11] Patent Number: 5,712,966
[45] Date of Patent: Jan. 27, 1998

[54] MEDICAL IMAGE PROCESSING APPARATUS

[75] Inventor: Ryoichi Nadachi, Paramus, N.J.

[73] Assignee: Kabushiki Kaisha Topcon, Tokyo, Japan

[21] Appl. No.: 590,149

[22] Filed: Jan. 23, 1996

Related U.S. Application Data

[63] Continuation-in-part of Ser. No. 215,585, Mar. 22, 1994, abandoned.

[51] Int. Cl.$^6$ .................................................... G06F 15/00
[52] U.S. Cl. .................................... 395/128; 345/146
[58] Field of Search .......................... 395/126–132; 345/112–120, 127, 145, 146; 348/188, 189, 184

[56] References Cited

U.S. PATENT DOCUMENTS

| | | | |
|---|---|---|---|
| 4,395,662 | 7/1983 | Sexton, Jr. | 315/371 |
| 4,568,975 | 2/1986 | Harshbarger | 348/189 |
| 4,649,324 | 3/1987 | Guerra et al. | 348/189 |
| 4,694,286 | 9/1987 | Bergstedt | 345/153 |
| 4,754,329 | 6/1988 | Lindsay et al. | 348/189 |
| 4,831,437 | 5/1989 | Nishioka et al. | 348/71 |
| 4,914,506 | 4/1990 | Kafer et al. | 348/182 |
| 4,998,165 | 3/1991 | Linstrom | 348/34 |
| 5,042,077 | 8/1991 | Burke | 364/413.22 |
| 5,119,178 | 6/1992 | Sakata et al. | 348/182 |
| 5,148,809 | 9/1992 | Biegeleisen-Knight et al. | 128/666.07 |
| 5,216,504 | 6/1993 | Webb et al. | 358/139 |
| 5,218,671 | 6/1993 | Liao et al. | 345/150 |
| 5,272,760 | 12/1993 | Echarer et al. | 364/413.22 |

OTHER PUBLICATIONS

Microsoft Windows, "Aldus Photostyler User Manual", Version 1.1, Second edition, Jun. 1992, Chap. 10 pp. 256–259, 246–251, 254–255, and 260–271.

*Primary Examiner*—Jack B. Harvey
*Assistant Examiner*—Xuong M. Chung-Trans
*Attorney, Agent, or Firm*—Finnegan, Henderson, Farabow, Garrett & Dunner, L.L.P.

[57] ABSTRACT

A medical image processing apparatus includes a color video monitor (image displaying device) 3 and an arithmetic and control circuit 4. When the apparatus is supplied with electric power and begins to operate, the arithmetic and control circuit 4 causes a color density bar 32 and a color density bar 42 to be displayed in parallel on a display screen 3a of the color video monitor 3. The color density bars 32, 42 each serve as a display adjusting image. The color density bar 32 is formed such that a density gradually becomes deep from an end of the bar 32 to the other end of the same. In the color density bar 42, it is deepened in a direction opposite to that of the color density bar 32.

8 Claims, 4 Drawing Sheets

FIG. 3
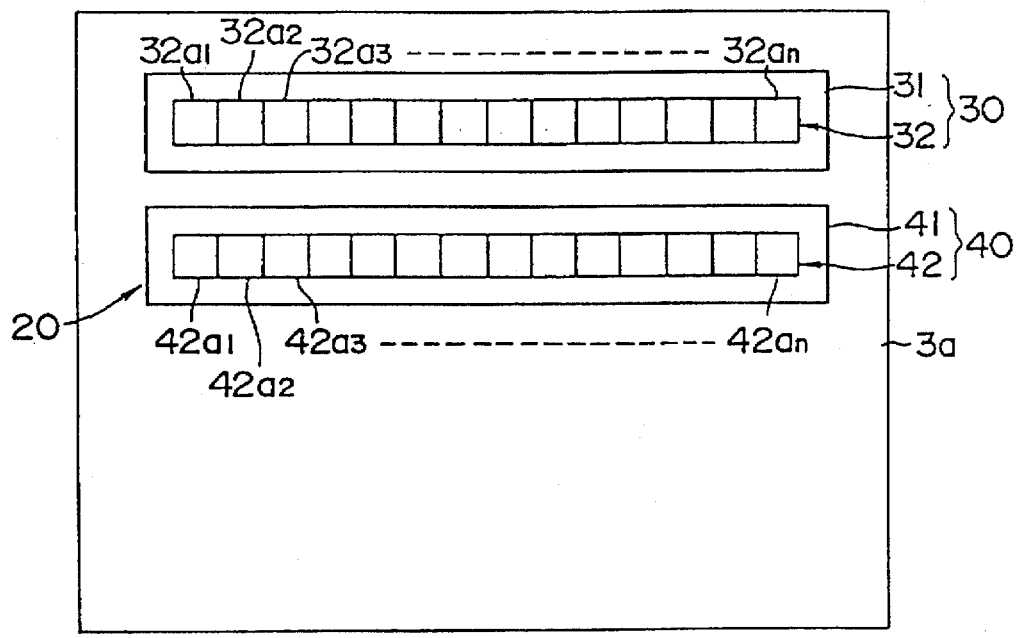
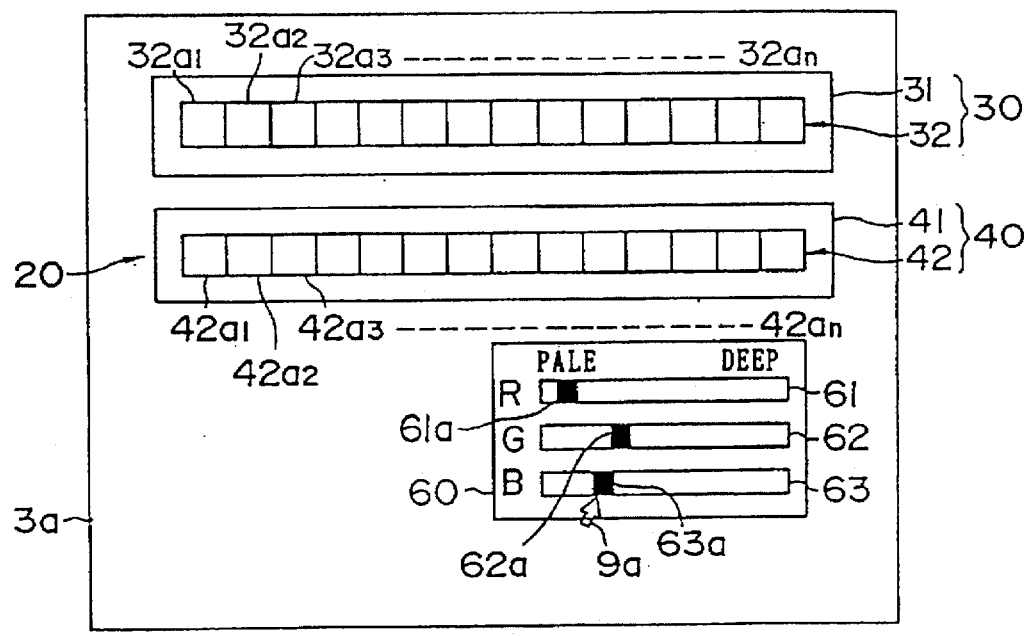
FIG. 4

MEDICAL IMAGE PROCESSING APPARATUS

This application is a continuation-in-part of application Ser. No. 08/215,585, filed Mar. 22, 1994, now abandoned.

BACKGROUND OF THE INVENTION

1. Field of the Invention

This invention relates to a medical image processing apparatus in which an initial image for adjusting the state of a display is displayed on the display screen of a display terminal when electric power is supplied to the apparatus and before image processing is carried out.

2. Description of the Prior Art

As this type of medical image processing apparatus, an apparatus is known which processes and analyzes an ophthalmologic image, such as an eye fundus image photographed by an eye fundus camera, a corneal endothelium image photographed by a corneal endothelium photographing instrument, or a sectional image of an eye fundus obtained by a slit lamp.

The medical image processing apparatus comprises a main body for processing and analyzing the ophthalmologic image and a video monitor (image displaying device) connected to the main body. The main body includes an arithmetic and control circuit, a floppy disk unit, an information recording and regenerating device such as an optical disk unit, and an information recording and regenerating device such as a hard disk unit.

Usually, in the apparatus, an EXE (executable) file installed in the hard disk for processing an ophthalmologic image is read by the arithmetic and control circuit and then a starting image for processing the image is displayed on the display screen of the monitor when the apparatus is actuated.

Further, in the apparatus, a medical image is displayed on the display screen and a part of the image needed to process and analyze the image is denoted by a cursor controlled by, e.g., a mouse.

Since the color or shape of the medical image displayed on the display screen forms a judging factor in the processing or analyzing, it is desirable that the color or shape of the displayed image is viewed as the real color or shape of an object to be examined is viewed with the naked eye.

However, our perception of the color of the image displayed on the screen depends upon the lightness of a room in which the apparatus is located. For example, when the room is well lighted, cases often occur in which the brightness of the display is regulated to be extremely strong, so that the photographic density of the displayed image cannot be linearly changed and a brilliant part of the image becomes indistinguishable. Further, cases occur in which an operator judges that such an indistinguishable part of the displayed image has proper brightness and is not caused by imperfect adjustment to the display.

Further, if the vertical size of the display screen is not proper, the shape of the displayed image is distorted. However, a small distortion of the shape does not necessarily lead to an operator's judgment that the image is distorted. As a result, the operator cannot accurately analyze the image.

SUMMARY OF THE INVENTION

It is therefore an object of the invention to provide a medical image processing apparatus in which the color or distortion of a medical image displayed on a display screen of a video monitor can be easily adjusted by using an initial image displayed on the display screen. The initial image is displayed immediately after the apparatus is actuated. The adjustment is carried out according to a type of video monitor to be used.

A medical image processing apparatus according to the invention of claim 1 comprises an image displaying device and an arithmetic and control circuit. The arithmetic and control circuit causes a plurality of density bars to be displayed on a display screen of the image displaying device. The bars each serve as a display adjusting image and vary its density gradually from an end of the bar to the other end.

In a medical image processing apparatus according to the invention of claim 2, each of the bars is formed of a plurality of adjacent squares of which densities are different from each other. When the lengths of the sides of the square are equal to each other, a medical image is displayed without distortion.

In a medical image processing apparatus according to the invention of claim 3, the arithmetic and control circuit causes all the squares of the density bar to be displayed within a background bar colored so as to be distinguished from the squares.

In a medical image processing apparatus according to the invention of claim 4, the density bars comprise a first density bar in which a density gradually becomes deep from an end of the bar to the other and a second density bar in which a density gradually becomes deep in an opposite direction to that of the first density bar. The arithmetic and control circuit causes the first and second density bars to be displayed in parallel on the display screen.

In a medical image processing apparatus according to the invention of claim 5, the arithmetic and control circuit causes white and black background bars to be displayed in parallel on the display screen and causes one of the density bars to be displayed within the white background bar and the other of the density bars to be displayed within the black background bar.

BRIEF DESCRIPTION OF THE DRAWINGS

FIG. 3 is a descriptive drawing of an example of initial images displayed on a display screen of a color video monitor of the apparatus of FIG. 1(a).

FIG. 4 is a descriptive drawing of another example of initial images displayed on the display screen of FIG. 1(a).

DETAILED DESCRIPTION OF THE EMBODIMENT

The embodiment of the present invention will be hereinafter described with reference to the attached drawings.

Figure 1A:
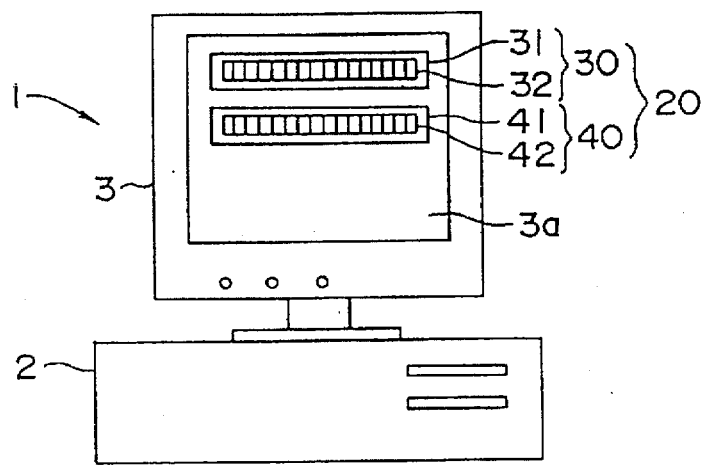
FIGS. 1(a) and 1(b) are a front view of a medical image processing apparatus according to the invention and a block schematic circuit diagram of the apparatus, respectively.

Referring to FIG. 1(a), a medical image processing apparatus 1 comprises a main body 2 for processing and analyzing a medical image and a color video monitor (image displaying device) 3 connected to the main body 2.

Figure 1B:
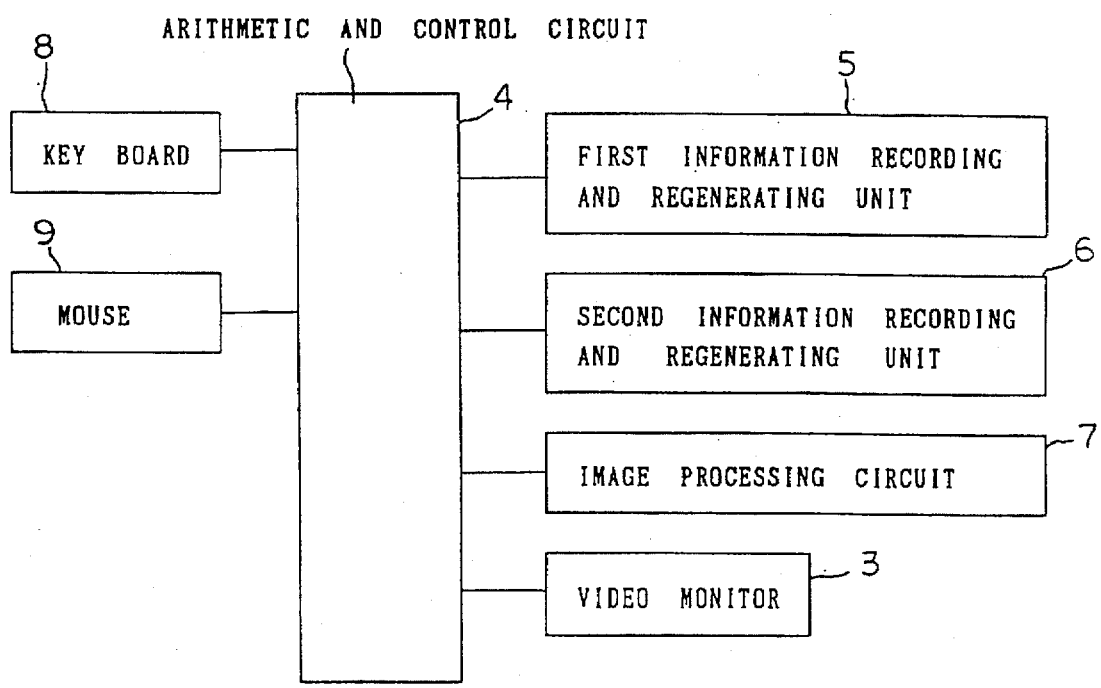

As shown in FIG. 1(b), the main body 2 includes an arithmetic and control circuit 4, a first information recording and regenerating unit 5 such as a floppy disk unit or an optical disk unit, a second information recording and regenerating unit 6 such as a hard disk unit, an image processing circuit 7, a key board 8, and a mouse 9.

Figure 2:
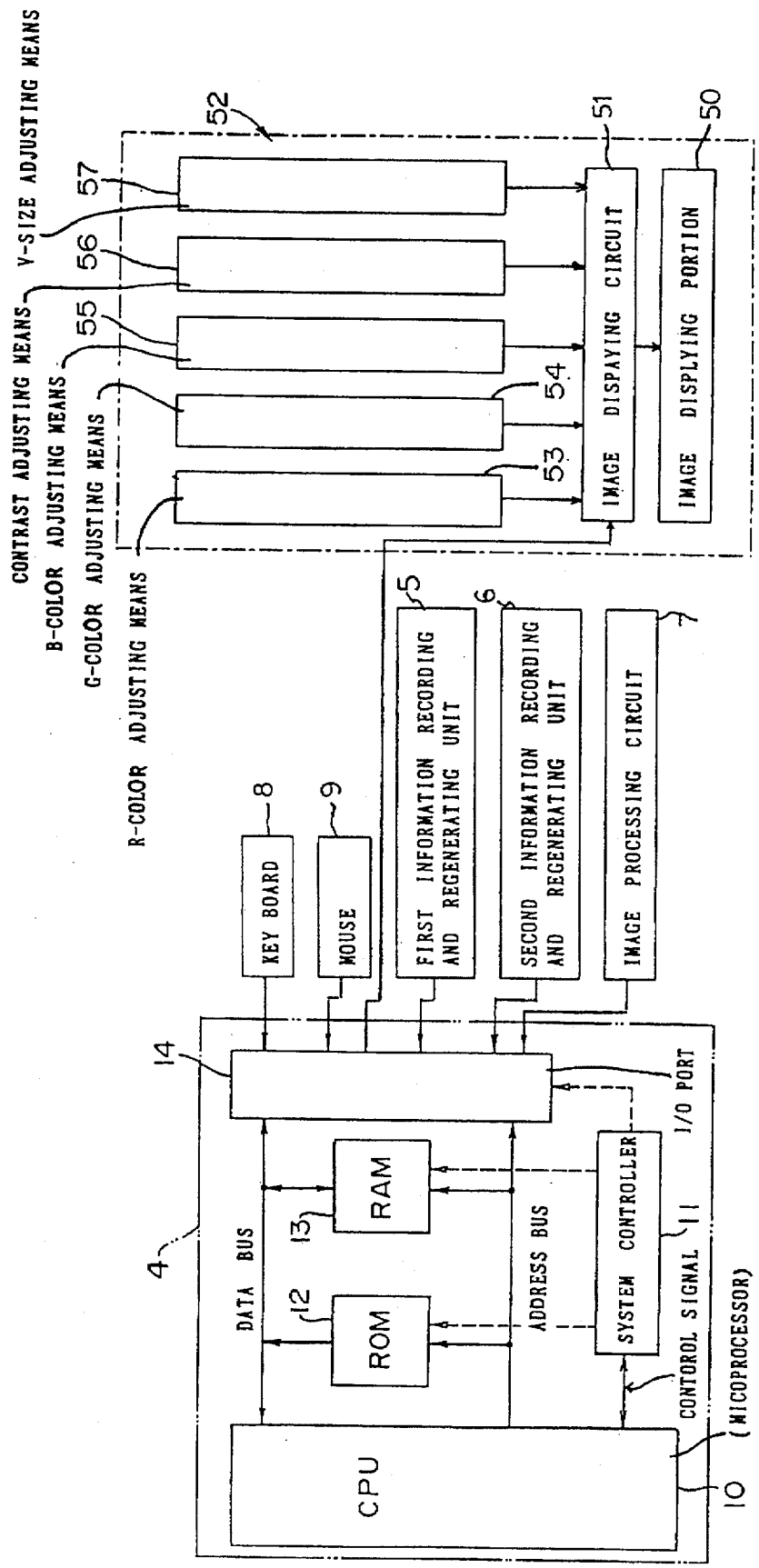
FIG. 2 is a detailed view of the circuit diagram of FIG. 1(b).

As shown in FIG. 2, the arithmetic and control circuit 4 includes a central processing unit (CPU) 10, a system controller 11, a ROM 12, a RAM 13, and an input-output unit 14.

The CPU 10 begins to operate when a power switch of the main body 2 is turned on, reads a program stored in the RUM 12 to perform initialization, and causes a display adjusting image 20 to be displayed on the display screen 3a of the color video monitor 3.

The system controller 11 exchanges a control signal with the CPU 10 to control the arithmetic and control circuit 4 wholly. The RAM 13 reads an external program or stores various data after the ROM 12 performs the initialization.

The color video monitor 3, first and second information recording and regenerating units 5, 6, image processing circuit 7, key board 8, mouse 9 are connected to the CPU 10, ROM 12, RAM 13, etc., via the input-output unit 14, A program file of the display adjusting image 20 is recorded in the first information recording and regenerating unit 5. After the ROM 12 performs the initialization, the CPU 10 reads the program file of the display adjusting image 20 prior to the other program files and then causes the adjusting image 20 to be displayed on the display screen 3a.

As shown in FIGS. 1(a) and 3, the display adjusting image 20 comprises display adjusting bars 30, 40 which are each horizontally long narrow and are placed in parallel. The adjusting bar 30 comprises a white background bar 31 and a color density variation bar (density variation indicator) 32 located within the white background bar 31. Likewise, the adjusting bar 40 comprises a black background bar 41 and a color density variation bar (density variation indicator) 42 located within the black background bar 41.

The color density variation bars 32, 42 comprise a plurality of squares 32al–32an and 42al–42an, respectively. The squares 32al–32an are different in density from each other. The squares 42al–42an are also different in density from each other. When a length ratio a:b of the vertical side to the horizontal side of each of the squares is equal to 1:1, an image displayed on the display screen is determined to have no distortion.

The squares 32al–32an of the bar 32 are, for example, white, yellow, cyan, green, magenta, red, blue, and black in order. That is, the bar 32 is constructed to become gradually deep in density from an end of the bar 32 to the other end.

Figure 5:
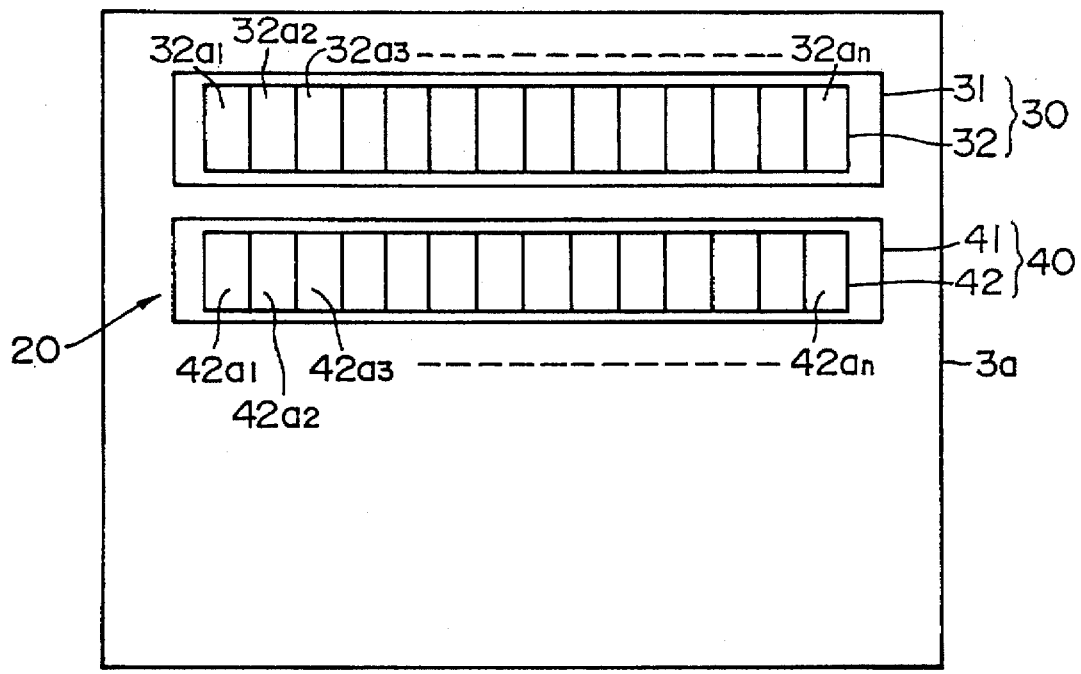
FIGS. 5 and 6 are views which show additional examples of display images.
Figure 6:
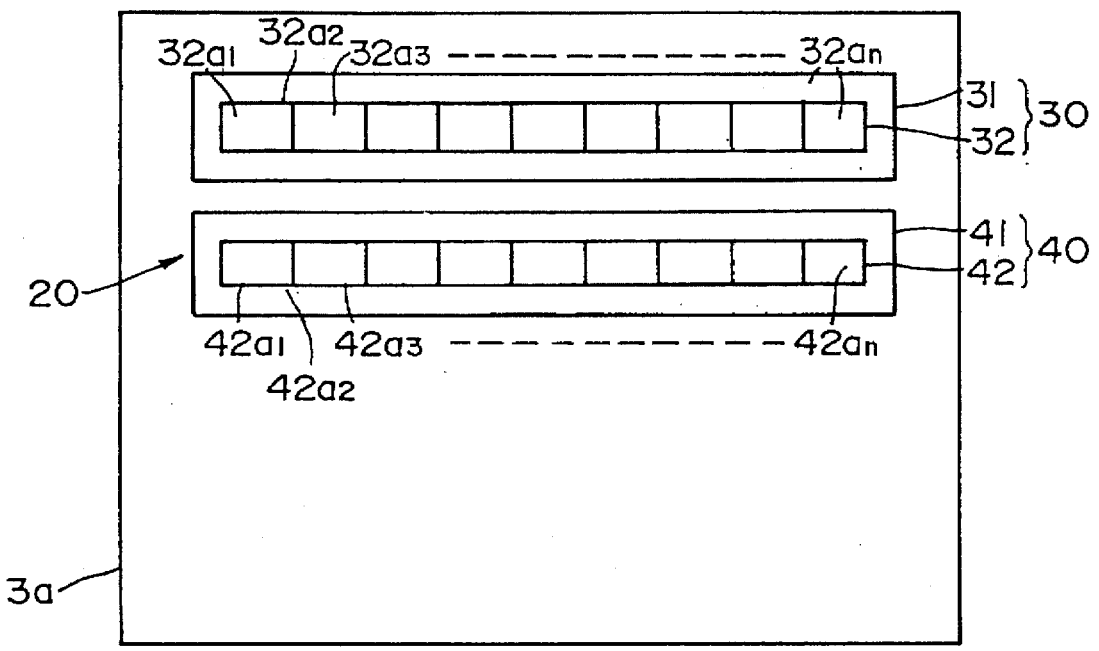

On the other hand, the squares 42al–42an of the bar 42 are, for example, black, blue, red, magenta, green, cyan, yellow, and white in order. That is, the bar 42 is constructed to gradually become pale in density from an end of the bar 42 to the other end. The above-mentioned density bars 32, 42 (density variation indicator) are constructed long and narrow by placing a plurality of adjacent squares 32al to 32an and 42al to 42an of which densities are different from each other. As shown in FIG. 5, the density bars may be constructed by placing adjacent rectangles 32al' to 32an' and 42al' to 42an' of which vertical sizes are a little longer than horizontal sizes thereof, or as shown in FIG. 6, may be constructed by placing adjacent rectangles 32al" to 32an" and 42al" to 42an" of which horizontal sizes are a little longer than vertical sizes thereof.

Further, in squares 32al to 32an of the density bars 32, colors of white, yellow, cyanogen, green, magenta, red, blue, black, etc. are set in order, whereas in squares 32al to 42an of the density bars 42, colors of black, blue, red magenta, green, cyanogen, yellow, white, etc. are set in order. The density bars 32, 42 (density variation indicator) may be monochrome density bars. That is, in squares 32al to 32an of the density bars 32, a density gradually varies from pale to deep from one area to another area thereof, whereas in squares 42al to 42an of the density bars 42, a density gradually varies from pale to deep in a direction opposite to that of the former. According to the density bars 32, 42 being formed by the monochromes as above, the density bars 32, 42 can clearly change from the most deep area to the most pale area step by step. Further, since the density bar 32 is disposed in the white background bar 31, the deep part of the density bar 32 is emphasized and easy to view. On the other hand, since the density bar 42 is disposed in the black background bar 41, the pale part of the density bar 42 is emphasized and easy to view. As a result, the density bars 32, 42, even the same density parts thereof, are viewed different from each other, and any part of the density bars can be clearly distinguished even if a background density is changed. This is the same as the color density variation.

As shown in FIG. 2, the color video monitor 3 includes an image displaying portion 50, such as a CRT (cathode ray tube) or an LCD (liquid crystal display), a circuit 51 which causes an image to be displayed on the image displaying portion 50, and a display adjusting means 52. The display adjusting means 52 includes a red adjusting volume key (R adjusting means) 53, a green adjusting volume key (G adjusting means) 54, a blue adjusting volume key (B adjusting means) 55, a contrast adjusting volume key (contrast adjusting means) 56, and a vertical size adjusting volume key (vertical size adjusting means) 57.

A description will now be given of the action of the medical image processing apparatus according to the invention.

When the power switch, not shown, of the main body 2 is turned on, the CPU 10 begins to operate. The CPU first reads a program stored in the ROM 12 to perform initialization. After that, the CPU 16 reads a program file of a display adjusting image 20 recorded in the first information recording and regenerating unit 5 prior to other program files, so that the display adjusting image 20 is displayed on the display screen 3a.

If a length ratio a:b of the vertical side to the horizontal side of each of the squares 32al–32an and 42al–42an is not 1:1, the vertical size adjusting volume key 57 is regulated so as to change the vertical size of each of the squares of 32al–32an and 42al–42an and cause the ratio a:b to be 1:1. If the ratio a:b of the vertical to the horizontal size has the ratio of 1:1, any image is displayed on the display screen 3a without distortion.

Further, if the color of the middle square of the bar 32 is not perceived as that of the middle square of the bar 42, the red, green, and blue adjusting volume keys are regulated so that both the colors are perceived as same.

The invention is not necessarily limited to the above embodiment in which the red, green, and blue adjusting volume keys are regulated in order to adjust the color of the display screen 3a.

For example, as shown in FIG. 4, the color of the display screen 3a may be adjusted such that a color adjusting window 60 is displayed on the screen 3a and then adjusting cursors 61a, 62a, 63a of, for example, red, green, and blue adjusting bars 61, 62, 63 within the window 60 are moved leftward or rightward by means of a cursor 9a of a mouse 9.

Further, instead of the density variation bars 32 and 42, a circular density variation indicator may be used in which a plurality of sectors obtained by dividing the circle at equal angles become deep in density clockwise or counterclockwise.

As mentioned above, since the invention is arranged such that the arithmetic and control circuit causes a plurality of bars in which a density gradually becomes deep from an end of the bar to the other end to be displayed on the display screen of the image displaying device, the color of a medical image displayed on the display screen can be easily adjusted to the image displaying device or conditions being used on the basis of an initial image of the bars displayed on the display screen immediately after the actuation of the apparatus.

Further, since the invention is arranged such that each of the bars is formed of a plurality of adjacent squares of which densities are different from each other and a medical image is controlled to be displayed on the display screen without distortion when the lengths of the sides of the square are equal to each other, an adjustment for removing the distortion of the displayed medical image can be easily carried out.

Further, the invention is arranged such that the arithmetic and control circuit causes all the squares of the density bar to be displayed within a background bar colored so as to be distinguished from the squares, the density bar can be easily found and enable an image adjustment to be easily carried out.

Further, since the invention is arranged such that the density bar comprises a first density bar in which a density gradually becomes deep from an end of the bar to the other end and a second density bar in which a density gradually becomes deep in an opposite direction to that of the first density bar and the arithmetic and control circuit causes the first and second density bars to be displayed in parallel on the display screen, the color of a displayed medical image can be more properly adjusted.

Further, the invention is arranged such that the arithmetic and control circuit causes white and black background bars to be displayed in parallel on the display screen and causes one of the density bars to be displayed within the white background bar and the other of the density bars to be displayed within the black background bar, an adjustment to the distortion of a displayed medical image as well as to the color of the same can be easily and correctly carried out.

What is claimed is:

1. A medical image processing apparatus comprising:
   an image displaying device;
   a system for processing medical images and for outputting the images to the image displaying device;
   said processing system causing white and black background bars to be displayed in parallel on a display screen of said image displaying device when said medical image processing apparatus is turned on, said processing system having an arithmetic and control circuit which causes first and second density bars each serving as a display adjusting image to be displayed within said white and black background bars respectively; and
   said processing system instructing said arithmetic and control circuit to generate said first density bar in which a density gradually varies from pale to deep from one area to another area of said first density bar and said second density bar in which a density gradually varies from pale to deep in a direction opposite to that of said first density bar.

2. A medical image processing apparatus according to claim 1, wherein said density bars are monochromes.

3. A medical image processing apparatus according to claim 2, wherein said density bars each comprises a plurality of adjacent squares of which densities are different from each other and a medical image is set to be displayed on said display screen without distortion when vertical and horizontal sizes of each of said squares are equal to each other.

4. A medical image processing apparatus according to claim 2, wherein said density bars each comprises a plurality of adjacent rectangles of which densities are different from each other.

5. A medical image processing apparatus according to claim 4, wherein said rectangles are formed with a longer vertical dimension than horizontal dimension in order to easily distinguish the density.

6. A medical image processing apparatus according to claim 1, wherein said density bars each comprises a plurality of adjacent squares of which densities are different from each other and a medical image is set to be displayed on said display screen without distortion when vertical and horizontal sizes of each of said squares are equal to each other.

7. A medical image processing apparatus according to claim 1, wherein said density bars each comprises a plurality of adjacent rectangles of which densities are different from each other.

8. A medical image processing apparatus according to claim 7, wherein said rectangles are formed with a longer vertical dimension than horizontal dimension in order to easily distinguish the density.

* * * * *